(12) United States Patent
Jang et al.

(10) Patent No.: US 8,992,849 B2
(45) Date of Patent: Mar. 31, 2015

(54) APPARATUS FOR PREPARING SILICON NANOPARTICLE USING ICP

(71) Applicant: Korea Institute of Energy Research, Daejeon (KR)

(72) Inventors: Bo-Yun Jang, Daejeon (KR); Joon-Soo Kim, Daejeon (KR); Jin-Seok Lee, Daejeon (KR)

(73) Assignee: Korea Institute of Energy Research, Daejeon (KR)

(*) Notice: Subject to any disclaimer, the term of this patent is extended or adjusted under 35 U.S.C. 154(b) by 0 days.

(21) Appl. No.: 14/068,797

(22) Filed: Oct. 31, 2013

(65) Prior Publication Data

US 2014/0301910 A1 Oct. 9, 2014

(30) Foreign Application Priority Data

Apr. 4, 2013 (KR) .................. 10-2013-0036856

(51) Int. Cl.
*B01J 19/08* (2006.01)

(52) U.S. Cl.
CPC .......... *B01J 19/08* (2013.01); *B01J 2219/0894* (2013.01)
USPC ........................................................ 422/186

(58) Field of Classification Search
CPC .................. B01J 19/09; B01J 2219/0894
USPC ..................... 422/186.04, 186.22, 186.23
See application file for complete search history.

(56) References Cited

U.S. PATENT DOCUMENTS

| | | | | |
|---|---|---|---|---|
| 2001/0002006 | A1* | 5/2001 | Huckestein | 210/90 |
| 2007/0051634 | A1* | 3/2007 | Poole et al. | 205/109 |
| 2007/0262482 | A1* | 11/2007 | Halpap et al. | 264/10 |
| 2009/0255222 | A1* | 10/2009 | Cortez et al. | 55/295 |
| 2012/0055285 | A1* | 3/2012 | Mercuri et al. | 75/362 |

OTHER PUBLICATIONS

Jang et al., "Microstructures of Silicon Nanoparticles Synthesized Using Double Tube Reactor with Inductively Coupled Plasma", Journal of the Korean Physical Society, vol. 57, No. 4, Oct. 2010, pp. 1029-1032.*

* cited by examiner

*Primary Examiner* — Kishor Mayekar
(74) *Attorney, Agent, or Firm* — Lowe Hauptman & Ham, LLP

(57) ABSTRACT

Disclosed is an apparatus for preparing silicon nanoparticles. The apparatus includes a corona discharge section charging silicon nanoparticles to exhibit unipolarity in order to prevent agglomeration of the silicon nanoparticles after the silicon nanoparticles are generated from an injected gas by plasma reaction of an inductively coupled plasma (ICP) coil. The apparatus may facilitate grain size control of silicon nanoparticles while improving discharge performance of a mesh filter for collection of generated nanoparticles by preventing agglomeration of the silicon nanoparticles generated by plasma reaction using inductively coupled plasma (ICP), and may permit replacement of the mesh filter even during operation of the apparatus, thereby improving productivity while reducing manufacturing costs.

7 Claims, 3 Drawing Sheets

APPARATUS FOR PREPARING SILICON NANOPARTICLE USING ICP

CROSS-REFERENCE TO RELATED APPLICATION

This application claims priority to Korean Patent Application No. 10-2013-0036856 filed on Apr. 4, 2013, and all the benefits accruing therefrom under 35 U.S.C. §119, the contents of which is incorporated by reference in its entirety.

BACKGROUND

1. Technical Field

The present invention relates to an apparatus for preparing silicon nanoparticles, which can improve grain size control performance and production efficiency of nanoparticles by preventing agglomeration of the nanoparticles generated by a plasma reactor.

2. Description of the Related Art

Generally, battery capacity of a lithium-ion battery depends on materials used as an anode terminal. For example, a carbon electrode-type lithium-ion battery using a carbon electrode as the anode terminal has a battery capacity of 375 mAh/g, which is a theoretical capacity of carbon (C).

However, the carbon electrode has a fundamental limit in that it cannot be applied to a high-capacity lithium-ion battery due to a theoretical capacity of carbon (C) of 375 mAh/g, despite merits of carbon (C) exhibiting excellent charge and discharge efficiency.

Thus, in order to realize the high-capacity lithium-ion battery, it is necessary to use a material, which can be used as an anode terminal and has higher theoretical capacity than that of carbon (C).

One example of such a material includes silicon (Si). Silicon (Si) has a theoretical capacity of 4200 mAh/g, which is higher than that of carbon (C), and is selected as an optimal material capable of realizing a high-capacity lithium-ion battery.

However, although silicon (Si) has a theoretical capacity of 4200 mAh/g, a silicon electrode-type lithium-ion battery using silicon (Si) as the anode terminal undergoes extremely high volume expansion up to about 400% due to formation of $Li_{4.4}Si$ by reaction of $Li_{4.4}$ and Si during charging thereof.

As described above, the volume expansion of about 400% generated in the silicon electrode-type lithium-ion battery can generate cracks of silicon forming a silicon electrode, and can cause short circuit of the silicon electrode in severe cases.

However, silicon (Si) also reduces stress caused by volume expansion when a particle size thereof changes from micrometer scale ($\mu m$) to nanometer scale (nm), and the silicon electrode is formed of nanometer scale (nm) silicon particles using such properties, thereby easily realizing a high-capacity lithium-ion battery.

Thus, various methods and apparatuses for preparing nanometer scale (nm) silicon particles from silicon (Si) have been developed and applied in the art.

Examples of such methods include methods of preparing silicon nanoparticles via vapor phase or liquid phase reaction. In particular, a method of preparing silicon nanoparticles using plasma has significantly improved production efficiency (=an amount of prepared nanoparticles/an amount of input raw materials), which is required to reduce manufacturing costs, and thus is broadly applied in the art.

BRIEF SUMMARY

The present invention has been conceived to solve such problems in the art, and an aspect of the present invention is to provide an apparatus for preparing silicon nanoparticles, which may facilitate grain size control of silicon nanoparticles while improving discharge performance of a mesh filter for collection of generated nanoparticles by preventing agglomeration of the silicon nanoparticles generated by plasma reaction using inductively coupled plasma (ICP), and may permit replacement of the mesh filter even during operation of the apparatus, thereby improving productivity while reducing manufacturing costs.

In accordance with an aspect of the present invention, an apparatus for preparing silicon nanoparticles includes: a corona discharge section charging silicon nanoparticles to exhibit unipolarity in order to prevent agglomeration of the silicon nanoparticles after the silicon nanoparticles are generated from an injected gas by plasma reaction of an inductively coupled plasma (ICP) coil.

The corona discharge section may be disposed under the ICP coil, and the ICP coil may be connected to a lower end of a gas injection section through which the gas is injected.

The corona discharge section may include: a dispersion portion dispersing the silicon nanoparticles generated in the plasma reaction section by discharging the silicon nanoparticles downwards; and a corona discharger disposed under the dispersion portion and supplying ions.

The apparatus may further include: a cooling section disposed under the corona discharge section and cooling the silicon nanoparticles; and a collecting chamber removably coupled to a lower side the cooling section by a coupling member, and filtering and collecting the silicon nanoparticles discharged downwards through the cooling section.

The cooling section may include: an air-cooling portion cooling the silicon nanoparticles by injecting a cooling gas into a lower space perpendicular to the corona discharge section; and a water-cooling portion cooling the silicon nanoparticles by a coolant jacket formed on an outer surface of a wall extending downwards from the air-cooling portion in a diagonal direction and having an area gradually narrowing downwards.

The cooling section may be formed at an upper side thereof with a gas discharge portion, which discharges the gas and the silicon nanoparticles discharged downwards from the corona discharge section and not collected by the collecting section.

The collecting section may include: a mesh filter removably provided to an inner path of the collecting section by sliding the mesh filter in a lateral direction, and selectively collecting ultrafine silicon nanoparticles discharged from above the collecting section; and a valve disposed at an inlet of the mesh filter and blocking flow of fluid passing through the inner path upon separation of the mesh filter.

The collecting section may further include: a view port formed on a wall thereof and allowing the mesh filter to be observed by the naked eye for determination of a replacement time.

The apparatus may further include: a vacuum device disposed at an outlet of the mesh filter of the collecting section and adjusting pressure of the inner path of the collecting section.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Hereinafter, embodiments of the present invention will be described in more detail with reference to the accompanying drawings. It should be understood that the present invention is not limited to the following embodiments and may be embodied in different ways, and that the embodiments are provided for complete disclosure and thorough understanding of the invention by those skilled in the art.

Figure 1:
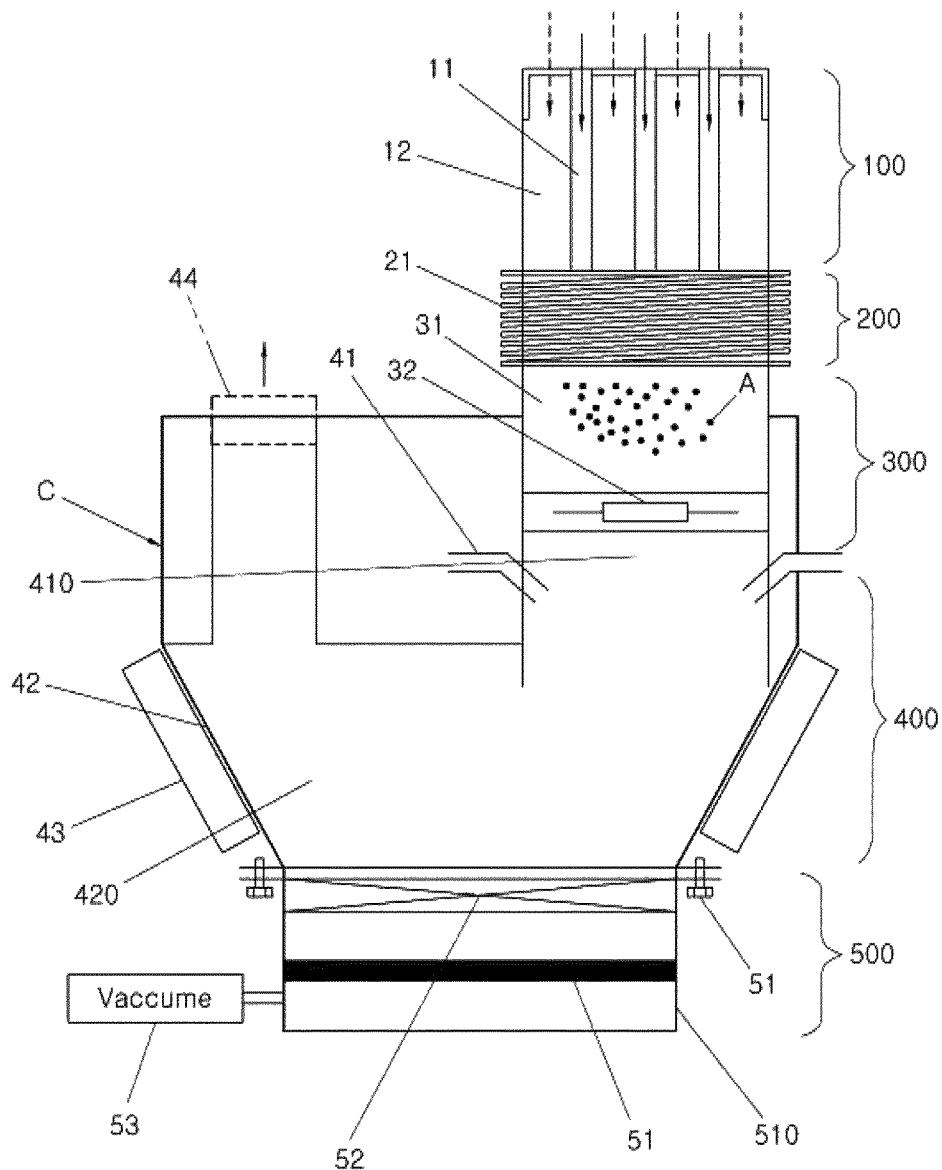
FIG. 1 is a sectional view of an apparatus for preparing silicon nanoparticles according to one embodiment of the present invention.

FIG. 1 shows a schematic structure of an apparatus for preparing silicon nanoparticles according to one embodiment of the present invention.

Referring to FIG. 1, the apparatus for preparing silicon nanoparticles includes: a gas injection section 100 into which a gas for preparation of silicon nanoparticles is injected; a plasma reaction section 200 to which the gas injected into the gas injection section 100 is supplied; a corona discharge section 300 through which silicon nanoparticles (A) generated in the plasma reaction section 200 passes; a cooling section 400 which cools the silicon nanoparticles (A) having passed through the corona discharge section 300; and a collecting section 500 which selectively collects the silicon nanoparticles (A) having passed through the cooling section 400.

According to the invention, while the silicon nanoparticles (A) generated from the gas, injected into a chamber (C) through the gas injection section 100 and passing through the plasma reaction section 200, are selectively collected by the collecting section 500, agglomeration of the silicon nanoparticles (A) is prevented by operation of the corona discharge section 300 and the cooling section 400, thereby improving preparation efficiency of the silicon nanoparticles (A) having an ultrafine size.

Hereinafter, the apparatus for preparing silicon nanoparticles according to the embodiment of the invention will be described in more detail. As shown in FIG. 1, the gas injection section 100 includes: a first gas injection path 11 through which a gas for generation of silicon nanoparticles (A) is injected; and a second gas injection path 12 through which a gas for surface reaction of the silicon nanoparticles (A) is injected.

Each of the first and second gas injection paths 11, 12 may be connected to the plasma reaction section 200 placed inside the chamber (C) such that the gases are separately injected therethrough.

Here, a first gas including a precursor such as silane ($SiH_4$) for preparation of the silicon nanoparticles (A) is supplied through the first gas injection path 11, and a second gas for surface reaction of the silicon nanoparticles (A), which will be formed from the first gas, is separately supplied through the second gas injection path 12.

Here, the second gas may be hydrogen ($H_2$) gas or a gas including a boron (B) or phosphorus (P) compound gas for doping of the silicon nanoparticles (A), and each of the first and second gases may be mixed with argon (Ar) acting as a carrier.

The plasma reaction section 200 has an inductively coupled plasma (ICP) coil 21 wound around an outer circumference thereof, and allows the gas supplied through the gas injection section 100 to pass through a path inside the ICP coil 21.

Thus, the silicon nanoparticles (A) are generated through chemical reaction by plasma generated upon application of power to the ICP coil 21 and are discharged downwards along with the remaining gas after reaction.

In particular, a height of a lower end of the gas injection section 100 connected to the plasma reaction section 200 is adjusted such that the lower end of the gas injection section 100 is connected to an upper portion of the ICP coil 21, thereby controlling a plasma reaction region of the gas.

In this way, the reaction region may be narrowly created through adjustment of the height of the gas injection section 100, thereby removing plasma spreading which deteriorates grain size properties of the silicon nanoparticles (A).

In the corona discharge section 300, a large amount of ions is supplied to the silicon nanoparticles (A), which are generated in the plasma reaction section 200 and discharged downwards, such that the silicon nanoparticles (A) can be charged by the ions.

By way of example, the corona discharge section 300 may include: a dispersion path 31 which discharges the silicon nanoparticles (A) generated in the plasma reaction section 200 by dispersing the silicon nanoparticles (A) downwards; and a corona discharger 32 which is disposed under the dispersion path 31 and supplies ions upwards.

Thus, the silicon nanoparticles (A) have the same polarity due to the ions supplied by the corona discharge section 300, and agglomeration of the silicon nanoparticles (A) is prevented by mutual repulsive force, thereby further reducing the size of the prepared silicon nanoparticles (A).

The cooling section 400 cools the silicon nanoparticles (A), which pass through the corona discharge section 300 and are discharged downwards.

Specifically, the cooling section 400 includes: an air-cooling portion 410 formed in a lower space perpendicular to the corona discharge section 300; and a water-cooling portion 420, which includes a wall 42 extending downwards from a lower side of the air-cooling portion 410 in a diagonal direction and having an area gradually narrowing downwards, and a coolant jacket 43 formed on an outer surface of the wall 42.

The air-cooling portion 410 includes a cooling gas supply port 41, through which an inert gas is supplied into the chamber (C) through which the silicon nanoparticles (A) discharged through the corona discharge section 300 pass.

The water-cooling portion 420 may include the coolant jacket 43 which allows coolant to circulate around the outer surface of the wall 42.

Here, the coolant introduced into the coolant jacket 43 of the water-cooling portion 420 may be selected from among water, refrigerants and liquid nitrogen. When the coolant is water, the coolant may have a temperature of 10° C. or less, and when the coolant is liquid nitrogen, the coolant may have a temperature of 50° C. or less.

The cooling section 400 is provided at one side of an upper portion thereof with a gas discharge portion 44. The gas discharge portion 44 discharges the gas and the silicon nanoparticles (A), which are discharged downwards from the corona discharge section 300 and are not collected by the collecting section 500.

In particular, since the cooling section 400 extends downwards in the diagonal direction, the gas discharge portion 44 may be formed at a location so as to allow the gas to be discharged upwards in a diagonal direction symmetrical to a diagonal direction in which fluid flows along the cooling section 400.

By discharging large particles, which are not filtered by the collecting section 500, through the gas discharge portion 44, the collecting section 500 may have improved discharge performance, and the amount of collected ultrafine silicon nanoparticles (A) may be increased.

In addition, the collecting section 500 includes a mesh filter 51, which allows only the silicon nanoparticles (A) having a predetermined size or less to pass therethrough such that only ultrafine silicon nanoparticles (A) can be selectively collected by the collecting section 500.

In particular, the collecting section 500 may include a separate collecting chamber 510, which is removably attached to a lower end of the cooling section 400 by a coupling member 56, such as bolts and the like.

Figure 2:
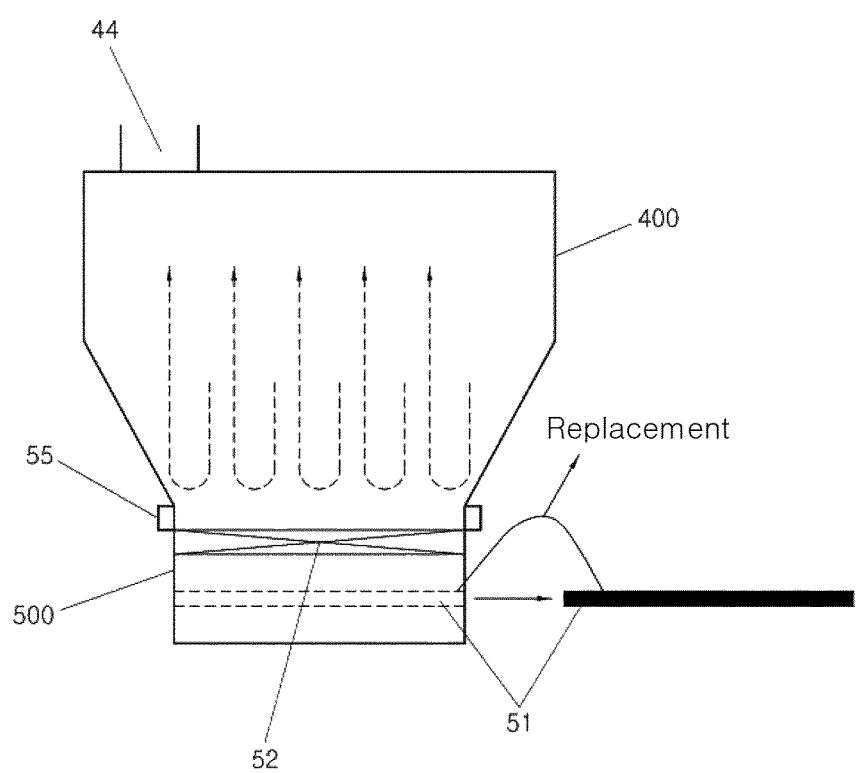
FIG. 2 is a sectional view of a lower portion of the apparatus for preparing silicon nanoparticles according to the embodiment of the present invention.

FIG. 2 illustrates the collecting section 500 of the apparatus for preparing silicon nanoparticles according to the embodiment of the present invention.

Referring to FIG. 2, since the mesh filter 51 is removably disposed in an inner path of the collecting section 500, the mesh filter 51 may be replaced when a large amount of silicon nanoparticles (A) is accumulated on the mesh filter 51.

Here, the mesh filter 51 may be provided to or removed from the inner path of the collecting section 500 by sliding the mesh filter 51 in a lateral direction.

In addition, the mesh filter 51 is provided at an inlet thereof with a valve 52, which is capable of blocking flow of fluid passing through the collecting section 500 when the mesh filter 51 is removed for replacement. With this configuration, the mesh filter 51 may be replaced after the valve 52 is closed, even during operation of the apparatus.

Figure 3:
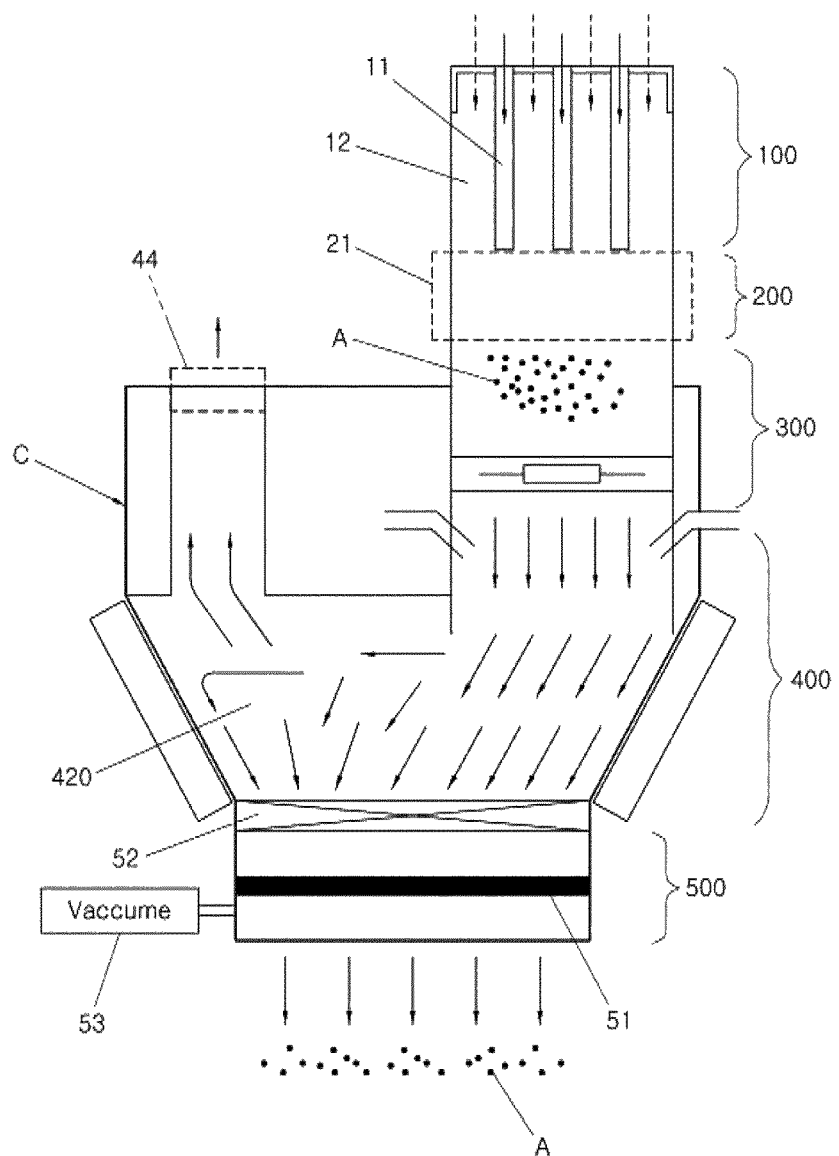
FIG. 3 is a conceptual diagram showing operation of the apparatus for preparing silicon nanoparticles according to the embodiment of the present invention.

FIG. 3 shows gas flow when the valve 52 is closed for replacement of the mesh filter 51. Here, the silicon nanoparticles (A) blocked by the valve 52 stay inside the chamber (C) and are then collected again when the valve 52 is opened after replacement of the mesh filter 51.

When the valve 52 is closed for a long time and the chamber (C) has a high inner pressure, some of the gas is discharged through the gas discharge portion 44 formed at the upper portion of the cooling section 400.

Here, the collecting section 500 may include a view port 55, which is formed on the wall thereof and allows the mesh filter 51 to be observed by the naked eye for determination of a replacement time.

In addition, the mesh filter 51 may be provided at an outlet thereof with a vacuum device 53, which adjusts operation pressure of the collecting section 500 when a discharge amount varies due to replacement of the mesh filter 51.

FIG. 3 shows operation of the apparatus for preparing silicon nanoparticles according to the embodiment of the present invention.

Referring to FIG. 3, the apparatus according to the embodiment can prevent silicon nanoparticles (A) prepared by plasma from being agglomerated due to high energy thereof by charging the silicon nanoparticles (A) generated in the plasma reaction section 200 to have the same polarities through the corona discharge section 300, and rapidly cooling the silicon nanoparticles (A) through the cooling section 400.

In addition, the silicon nanoparticles (A) discharged from the corona discharge section 300 are forced to move downwards in a diagonal direction through the cooling section 400, thereby improving cooling effects due to the water-cooling portion 420.

Further, since silicon nanoparticles (A) having a desired grain size are discharged and collected by the mesh filter 51 in the collecting section 500, and the silicon nanoparticles (A) and gas filtered by the mesh filter 51 are discharged through the gas discharge portion 44 in a direction opposite to a traveling direction thereof, the inner pressure of the chamber (C) is prevented from increasing, and the silicon nanoparticles (A) are prevented from being excessively deposited on the mesh filter 51, thereby reducing replacement frequency of the mesh filter 51.

Furthermore, since the mesh filter 51 may be replaced after the valve 52 of the collecting section 500 is closed to block discharge flow without stopping operation of the apparatus, production efficiency can be improved by reducing downtime of the apparatus.

In this way, according to the invention, the apparatus may produce ultrafine silicon nanoparticles by charging the silicon nanoparticles generated through plasma reaction to exhibit the same polarity and rapidly cooling the silicon nanoparticles to prevent agglomeration of the nanoparticles.

In addition, the apparatus may improve generation efficiency of the ultrafine silicon nanoparticles, while reducing replacement frequency of the mesh filter by discharging a gas including silicon nanoparticles, which do not pass through the mesh filter of the collecting section, in a direction opposite a direction of discharging the silicon nanoparticles.

Further, the apparatus may permit replacement of the mesh filter even during operation of the apparatus to prevent deterioration of efficiency due to re-operation of the apparatus, thereby improving productivity while reduce manufacturing costs.

Although some embodiments have been provided to illustrate the present invention, it will be apparent to those skilled in the art that the embodiments are given by way of illustration, and that various modifications and equivalent embodiments can be made without departing from the spirit and scope of the present invention. Accordingly, the scope of the present invention should be limited only by the accompanying claims and equivalents thereof.

What is claimed is:

1. An apparatus for preparing silicon nanoparticles, comprising:
  a first gas injection path configured to inject a first gas for generating silicon nanoparticles;
  a second gas injection path configured to inject a second gas for doping the silicon nanoparticles;
  a plasma reaction section connected with the first and second gas injection paths, and configured to generate and dope the silicon nanoparticles by using the injected gases;
  an inductively coupled plasma (ICP) coil winding around the plasma reaction section;
  a corona discharge section configured to charge the doped silicon nanoparticles to have a single polarity in order to prevent agglomeration of the silicon nanoparticles;
  a cooling section disposed under the corona discharge section and configured to cool the silicon nanoparticles discharged from the corona discharge section;
  a collecting section configured to filter and collect the cooled silicon nanoparticles, and removably coupled to a lower side of the cooling section by a coupling member,
  wherein the collecting section comprises a mesh filter removably coupled to an inner path of the collecting section, and configured to
    slide in and out in a lateral direction, and
    selectively collect ultrafine silicon nanoparticles among the silicon nanoparticles discharged from above the collecting section; and
  a valve disposed at an inlet of the mesh filter, and configured to block a flow of fluid passing through the inner path of the collecting section.

2. The apparatus according to claim 1, wherein the corona discharge section is disposed under the ICP coil, and
wherein the ICP coil is connected to lower ends of the gas injection paths.

3. The apparatus according to claim 2, wherein the corona discharge section comprises:
a dispersion portion configured to disperse the silicon nanoparticles downwards from the discharge section; and
a corona discharger disposed under the dispersion portion, and configured to supply ions to the dispersed silicon nanoparticles.

4. The apparatus according to claim 1, wherein the cooling section comprises:
an air-cooling portion configured to cool the silicon nanoparticles by injecting a cooling gas into inside the air-cooling portion; and
a water-cooling portion configured to cool the silicon nanoparticles by a coolant jacket formed on an outer surface of a wall of the water-cooling portion, the wall extends downwards from the air-cooling portion in a diagonal direction and has an area gradually narrowing downwards.

5. The apparatus according to claim 4, further comprising:
a gas discharge portion disposed at an upper side of the cooling section, and configured to discharge the injected gases, the cooling gas, and the silicon nanoparticles discharged downwards from the corona discharge section and not collected by the collecting section.

6. The apparatus according to claim 1 wherein the collecting section further comprises:
a view port formed on a wall of the collecting section, and configured to allow observation of the mesh filter.

7. The apparatus according to claim 1 further comprising:
a vacuum device disposed at an outlet of the mesh filter of the collecting section, and configured to adjust a pressure of the inner path of the collecting section.

* * * * *